United States Patent
Imai (10) Patent No.: US 8,558,923 B2
(45) Date of Patent: Oct. 15, 2013

(54) IMAGE CAPTURING APPARATUS AND METHOD FOR SELECTIVE REAL TIME FOCUS/PARAMETER ADJUSTMENT

(75) Inventor: Francisco Imai, Mountain View, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 171 days.

(21) Appl. No.: 12/772,841

(22) Filed: May 3, 2010

(65) Prior Publication Data

US 2011/0267531 A1    Nov. 3, 2011

(51) Int. Cl.
*H04N 5/262*    (2006.01)

(52) U.S. Cl.
USPC ....... 348/239; 348/345; 348/349; 348/333.12

(58) Field of Classification Search
USPC ............... 348/349, 353–356, 333.01, 333.12, 348/239, 345
See application file for complete search history.

(56) References Cited

U.S. PATENT DOCUMENTS

| | | | |
|---|---|---|---|
| 6,480,300 | B1 | 11/2002 | Aoyama |
| 6,741,251 | B2 * | 5/2004 | Malzbender ............. 345/428 |
| 2003/0142081 | A1 * | 7/2003 | Iizuka et al. ............ 345/173 |
| 2004/0197096 | A1 | 10/2004 | Hofer |
| 2007/0053675 | A1 | 3/2007 | Pollard |
| 2007/0071432 | A1 | 3/2007 | Senba |
| 2007/0189748 | A1 | 8/2007 | Drimbarean |
| 2007/0216796 | A1 | 9/2007 | Lenel |
| 2008/0055424 | A1 | 3/2008 | Jerdev |
| 2008/0107411 | A1 * | 5/2008 | Hope ...................... 396/121 |
| 2008/0131019 | A1 | 6/2008 | Ng |
| 2008/0170847 | A1 * | 7/2008 | Flannery ................. 396/222 |
| 2008/0204587 | A1 * | 8/2008 | Takahara et al. ....... 348/333.01 |
| 2008/0259172 | A1 * | 10/2008 | Tamaru ................... 348/218.1 |
| 2008/0259176 | A1 | 10/2008 | Tamaru |
| 2008/0292298 | A1 | 11/2008 | Hirai |
| 2009/0059061 | A1 | 3/2009 | Yu |
| 2009/0167928 | A1 | 7/2009 | Asukabe |
| 2009/0195666 | A1 | 8/2009 | Chen |
| 2009/0244354 | A1 | 10/2009 | Sakaguchi |
| 2009/0256947 | A1 * | 10/2009 | Ciurea et al. ........... 348/333.12 |

FOREIGN PATENT DOCUMENTS

| | | | |
|---|---|---|---|
| GB | 2452364 A | | 3/2009 |
| JP | 2001305642 A | * | 11/2001 |
| JP | 2006-345254 A | | 12/2006 |

* cited by examiner

*Primary Examiner* — Roberto Velez
*Assistant Examiner* — Yih-Sien Kao
(74) *Attorney, Agent, or Firm* — Canon USA Inc. IP Division (57) ABSTRACT

An image capturing apparatus and method for selective real-time focus/parameter adjustment. The image capturing apparatus includes a display unit, an adjustment unit, and a generation unit. The display unit is configured to display an image. The interface unit is configured to enable a user to select a plurality of regions of the image displayed on the display unit. The adjustment unit is configured to enable the user to adjust at least one focus/parameter of at least one selected region of the image displayed on the display unit. The generation unit is configured to convert the image including at least one adjusted selected region into image data, where at least one focus/parameter of the at least one adjusted selected region has been adjusted by the adjustment unit prior to conversion.

36 Claims, 8 Drawing Sheets

PRIOR ART

FIG. 5

IMAGE CAPTURING APPARATUS AND METHOD FOR SELECTIVE REAL TIME FOCUS/PARAMETER ADJUSTMENT

BACKGROUND OF THE INVENTION

1. Field of the Invention

The present invention generally relates to image processing and, more particularly, to an image capturing apparatus and method for selective real-time focus and/or other parameter adjustment, hereinafter referred to as focus/parameter adjustment.

2. Description of the Related Art

An image capturing apparatus, such as a digital still camera, digital video camera, a camera contained within a portable communication terminal (e.g., a cell phone), and/or the like, generally includes some mechanism for autofocus (AF) which performs focal position detection at each of a plurality of focus detection points in a field. The AF function typically performs control to focus on a focus detection point that is automatically or intentionally selected from among the focus detection points.

A focal point is a point where light rays originating from a point on an object of a scene converge, and the focal point is associated with sharpness perception. Adjustment of the focal point is one of the most important aspects in photography. The focal point is not strictly speaking just a point but has a spatial component because of aberrations and diffractions in the imaging optics that can be accentuated by increasing aperture and field of view.

Figure 4:
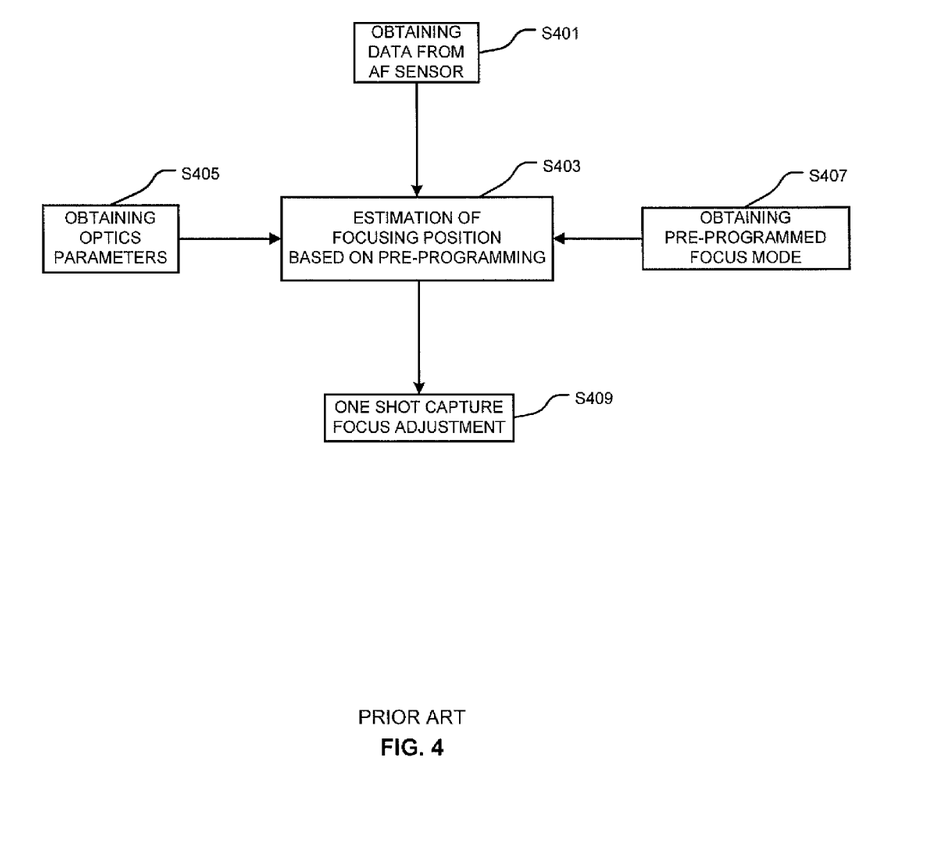
FIG. 4 illustrates active AF based signals using triangulation, amount of reflected sound emitter, and detection of the echo according to the prior art.

Early AF was active AF based on an ultrasonic reflected sound emitter and detection of the echo. This evolved to the use of infrared signals using triangulation, amount of reflected sound emitter, and detection of the echo. FIG. 4 illustrates this conventional approach. In this approach, an AF sensor, typically an infrared sensor, estimates the distance. Based on parameters of the optics (lens) and the AF mode, typically centered focus or focus on other part of the image, the AF sensor estimates the focal position that is appropriate for the lens.

In step S401, data from an AF sensor is obtained. In step S403, optics parameters obtained from step S405 and a pre-programmed focus mode obtained from step S407 are used for estimation of focusing position based on pre-programming. A one shot capture focus adjustment is made in step S409. Some advanced digital still cameras, such as the Canon EOS 5D Mark II, provide a limited number of regions to select for AF in the manual mode. However, AF does not provide the user with a natural way to select particular regions of the scene with different levels of focusing.

AF has evolved to encompass the preservation of a wider range of focal points relative to the scene being captured. There are methods to combine multiple images with a range of focus conditions, such as described in the Malzbender patent (U.S. Pat. No. 6,741,251 B2, issued on May 25, 2004). More recently, with the advent of the field of computational photography, there are methods to capture four dimensional light fields in specific image encoding and post-process the images in order to compute rendering of images in distinct focal points, such as the method proposed in the Ng application (U.S. Patent Application Publication No. 2008/0131019 A1, filed on Nov. 30, 2007).

Figure 5:
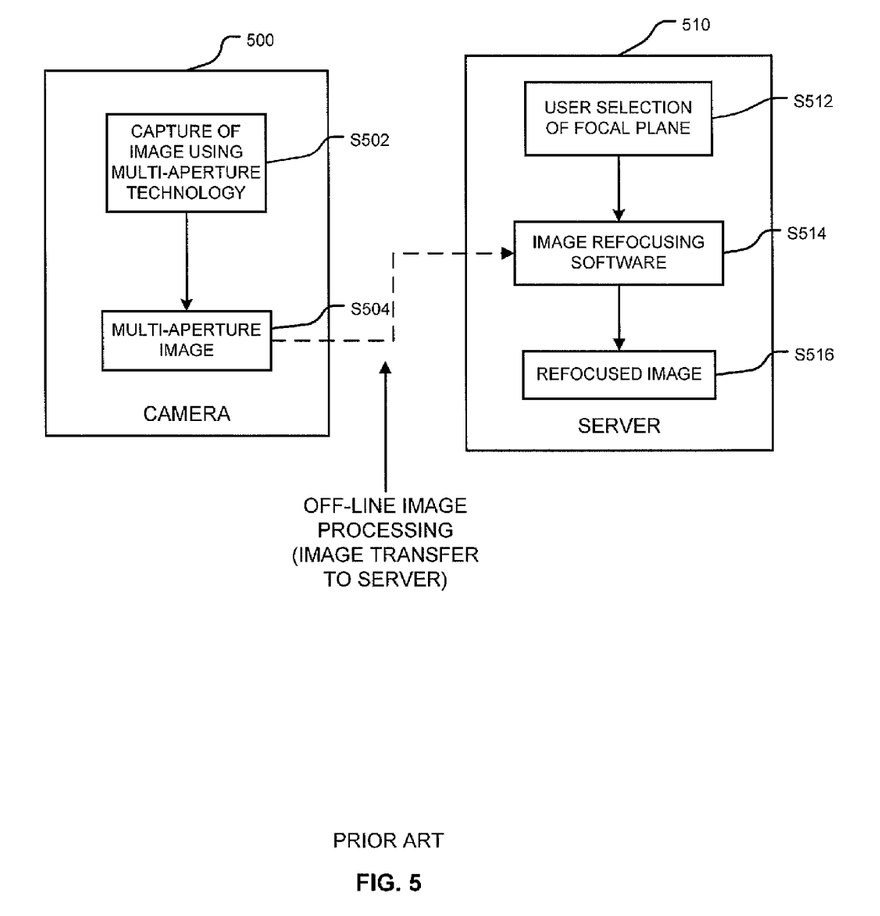
FIG. 5 illustrates conventional image capture where the capture data is processed after being transferred to a computing system.

The Ng application approach is illustrated in FIG. 5, where an image is captured in step S502 with a camera 500 by using a multi-aperture lens or sensor in step S504, and the captured data is processed after being transferred to a computing system, such as a server 510. The user can determine the focal plane in step S512 and the computer renders the appropriate image in step S516 using image refocusing software in step S514, resulting in focused image S516. Currently, the computational photography method described in the Ng application can only be accomplished by post-processing captured images and there is no feedback to the user while capturing the images. The Ng application also does not allow the user to creatively and selectively choose degrees of focusing and defocusing on one or more parts of the image during capture of the image.

Although preserving light fields is beneficial to re-render images under distinct focal points, these approaches have several drawbacks. (1) Current approaches are computationally intensive and require memory storage and therefore these approaches rely on post-processing in computers after the images are captured.

(2) There is currently no way for the photographer to specify, during photo shooting, which regions of a scene the photographer wants to control focusing and which degree of sharpness. Focusing is made automatically with AF. The alternative for the photographer is to shoot multiple pictures with manual focus and combine them resulting in mis-registration problems.

(3) Creative art photographers do not want every object in the scene to be focused. (4) Current AF methods do not work for all focusing and defocusing needs in creative photography.

Manual focusing generally occurs without any camera user interface aid. AF is generally provided without any real-time selectivity for degrees of focusing and defocusing for one or more parts of a scene. Computational photography multi-aperture generally occurs with post-processing without any feedback during capture on how the image would look like in the rendering.

Therefore, a need exists for an image capturing apparatus and method for image region selective real-time focus/parameter adjustment.

SUMMARY OF THE INVENTION

The present invention is directed to an image capturing apparatus that includes an interface unit for selectively adjusting a degree of focusing and/or other parameters in one or more regions of a scene by allowing the user to point out the region to be adjusted and adjust the degree of focusing and/or other parameters on the interface unit. The interface unit not only provides a natural interface for the user to select his creative intent but also provides a real-time feedback to the user.

According to an aspect of the present invention, an image capturing apparatus for selective real-time focus/parameter adjustment includes a display unit configured to display an image; an interface unit configured to enable a user to select a plurality of regions of the image displayed on the display unit; an adjustment unit configured to enable the user to adjust at least one focus/parameter of at least one selected region of the image displayed on the display unit; and a generation unit configured to convert the image including the at least one adjusted selected region into image data, where at least one focus/parameter of the at least one adjusted selected region has been adjusted by the adjustment unit prior to conversion.

According to another aspect of the present invention, an image capturing method is provided for an image capturing apparatus including a display unit, an interface unit, an adjustment unit, and a generating unit, for selective real-time focus/parameter adjustment, the method including displaying an image on the display unit; selecting a plurality of regions of the image displayed on the display unit; adjusting at least one focus/parameter of at least one selected region of the image displayed on the display unit; and converting the image including the at least one adjusted selected region into image data, where at least one focus/parameter of the at least one adjusted selected region has been adjusted by the adjustment unit prior to conversion.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention, together with the description, serve to explain the principles of the present invention.

DETAILED DESCRIPTION OF THE EMBODIMENTS

Exemplary embodiments of the present invention will now be described in detail with reference to the drawings.

Figure 1:
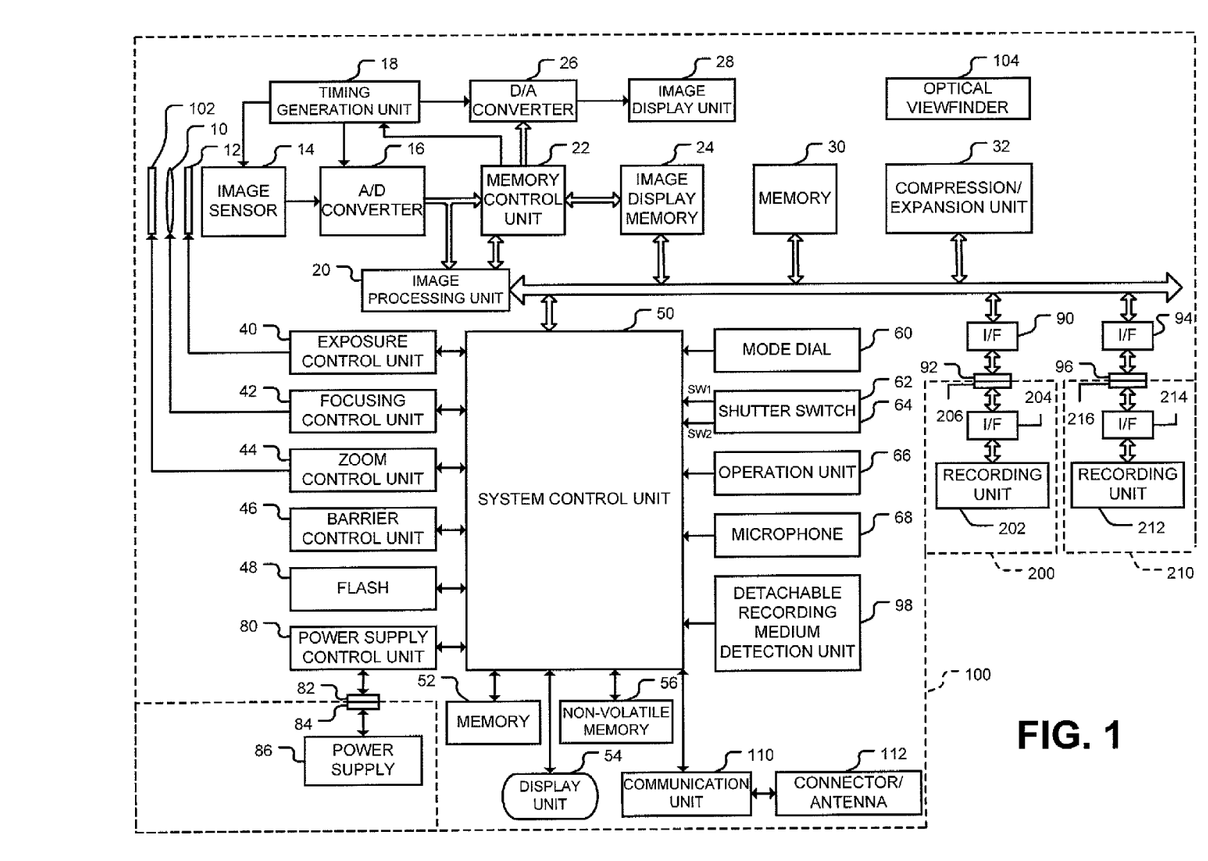
FIG. 1 is a block diagram illustrating a configuration of an image capturing apparatus according to an exemplary embodiment of the present invention.

FIG. 1 illustrates a configuration of an image capturing apparatus 100 according to an exemplary embodiment of the present invention. The image capturing apparatus 100 may be configured in a variety of configurations, such as, for example, a digital still camera, a digital video camera, a camera contained within a portable communication terminal (e.g., a cell phone), and/or the like.

An image capturing apparatus 100 includes a protection unit 102, a photographic lens 10, a shutter 12, an image sensor 14, an analog to digital (A/D) converter 16, a timing generation unit 18, and an image processing unit 20. The protection unit 102 serves as a cover to protect an imaging unit including the photographic lens 10 from soiling and breakage. The photographic lens 10 serves as an optical system, where the shutter 12 includes a diaphragm to act as a stop function. The image sensor 14 converts an optical image to electrical signals. The A/D converter 16 coverts an analog signal output from the image sensor 14 to a digital signal. The timing generation unit supplies a clock signal and a control signal to the image sensor 14, the A/D converter 16, and a digital to analog (D/A) converter 26. The timing generation unit 18 is controlled by a memory control unit 22 and a system control unit 50. These and other components of the image capturing apparatus 100 may be interconnected to one another via various bus lines, wiring, and/or the like.

The image processing unit 20 performs predetermined pixel interpolation and color conversion on data received from the A/D converter 16 or the memory control unit 22. Further, the image processing unit 20 performs a predetermined calculation using the captured image data. Furthermore, the image processing unit 20 performs a predetermined calculation using the captured image data and through-the-lens (TTL) auto-white balance (AWB) processing based on the calculation result. In white balance (WB) processing, block integration is performed by dividing a video signal into a plurality of blocks and acquiring an integration value of a color signal for each block to calculate the WB. Further, white search integration is performed by converting a signal value of each pixel in the video signal onto a chromaticity coordinate and acquiring an integration value of the color signal for a predetermined region. A setting of an integration region on the chromaticity coordinate which is used in the white search integration is stored in the image processing unit 20.

The image capturing apparatus 100 further includes the memory control unit 22, an image display memory 24, the D/A converter 26, and an image display unit 28.

The memory control unit 22 controls the A/D converter 16, the timing generation unit 18, the image processing unit 20, the D/A converter 26, a memory 30 and a compression/expansion unit 32. The data of the A/D converter 16 is written in the image display memory 24 or the memory 30 via the image processing unit 20 and the memory control unit 22, or via the memory control unit 22.

The image display unit 28 may be configured as a liquid crystal display (LCD) panel, a thin-film transistor LCD (TFT-LCD) panel, an organic light emitting diode (OLED) display panel, a transparent OLED (TOLED) display panel, a flexible display panel, a three-dimensional (3D) display panel, or the like, and may include a light-emitting diode (LED), a sound generator, or a combination thereof. Image data for display which is written in the image display memory 24 is displayed on the image display unit 28 via the D/A converter 26. An electronic finder function can be implemented by sequentially displaying the captured image data using the image display unit 28. Further, the image display unit 28 can arbitrarily switch a display screen on and off according to an instruction from a system control unit 50. If the image display unit 28 turns off the display, power consumption of the image capturing apparatus 100 can be greatly reduced.

The image display unit 28 displays captured still images and moving images, and may be provided with a touch pad layered thereon in the form of a touch-screen to allow a user to review a displayed image on the touch-screen and make changes, as will be described below. User interaction with the touch-screen can occur with a stylus, finger pressure, finger proximity, or the like. By selecting an area of interest with finger pressure, for example, the image capturing apparatus 100 can adjust parameters of the selected area. User interaction with the images displayed on the image display unit 28 may also be achieved through voice recognition. The image display unit 28 may also be configured to admit touch-screen inputs, keypad and/or functional/hot buttons into a user interface display to facilitate display, manipulation, and/or transmission of digital media files and/or other imaging functionality.

The image capturing apparatus 100 further includes the memory 30, the compression/expansion unit 32, an exposure control unit 40, a focusing control unit 42, a zoom control unit 44, a barrier control unit 46, a flash unit 48, and the system control unit 50.

The memory 30 stores captured still images and moving images. The memory 30 has a storage capacity large enough to store a predetermined number of still images and a moving image corresponding to a predetermined period of time.

Therefore, a large amount of image data can be written in the memory 30 at high speed in both a continuous shooting mode of continuously shooting a plurality of still images and a panorama shooting mode. Further, the memory 30 can be used as a work area of the system control unit 50.

The compression/expansion unit 32 compresses and decompresses the image data using adaptive discrete cosine transform (ADCT). The compression/expansion unit 32 reads an image stored in the memory 30 and compresses or decompresses the image, and writes the processed data in the memory 30.

The image capturing apparatus 100 includes a display unit 54 and is provided with a processing and/or shooting mode where real-time changes can be made in the focus and/or a variety of parameters of an image based on user defined values on the image capturing apparatus 100, hereinafter referred to as a selective focus/parameter shooting mode. In the selective focus/parameter shooting mode, a user selects a region of the image on the image display unit 28 or the display unit 54 to apply focus/parameter correction and/or alteration by interacting with the image capturing apparatus 100 manually or via voice recognition. The focus/parameters of a selected region of an image that can be modified by the user include image properties, such as focus, sharpness, color saturation, and the like. The selective focus/parameter shooting mode may be indicated on the mode dial. Alternatively, the image capturing apparatus 100 may be configured so the selective focus/parameter shooting mode may override other shooting modes to enable the user to make real-time changes to a particular image.

The system control unit 50 controls the image capturing apparatus 100. The exposure control unit 40 controls the shutter 12 which includes the diaphragm function. Further, the exposure control unit 40 includes a flash light amount control function in cooperation with the flash unit 48. The focusing control unit 42 controls focusing of the photographic lens 10. The exposure control unit 40 and the focusing control unit 42 are controlled by a TTL system.

More specifically, the system control unit 50 is configured to perform selective focus/parameter processing, autofocus (AF) processing, automatic exposure (AE) processing, automatic white balancing (AWB) processing, electronic flash pre-emission (EF) processing, or the like, according to the TTL system by controlling the exposure control unit 40 and the focusing control unit 42 based on a calculation result obtained by the image processing unit 20. The zoom control unit 44 controls zooming of the photographic lens 10. The barrier control unit 46 controls an operation of the protection unit 102. The flash unit 48 includes a function of emitting AF auxiliary light and the light amount control function.

Moreover, the image capturing apparatus 100 includes a memory 52, the display unit 54, and a non-volatile memory 56.

The memory 52 stores constants, variables, and programs to be used in operations of the system control unit 50. Further, the memory 52 stores a program diagram to be used in the AE processing. The program diagram is a table which defines a relationship between an aperture diaphragm diameter corresponding to an exposure value and a control value of shutter speed.

The display unit 54 may also be configured as an LCD panel, a TFT-LCD panel, an OLED display panel, a TOLED display panel, a flexible display panel, a 3D display panel, and/or the like, and may also include an LED, a sound generator, or a combination thereof. The display unit 54 displays an operation state or a message using characters, images, and sound according to execution of a program by the system control unit 50. One display unit 54 or a plurality of display units 54 may be provided near an operation unit 66 of the image capturing apparatus 100 so that it is easily visible for a user. A part of the functions of the display unit 54 may be installed within an optical viewfinder 104.

The display unit 54 may be configured to admit touch-screen inputs, keypad and/or functional/hot buttons into a user interface display to facilitate display, manipulation, and/or transmission of digital media files and/or other imaging functionality. The image capturing apparatus 100 may also incorporate additional user interface buttons, dials, switches, trackballs, joysticks, keypads, and/or the like in order to receive user inputs.

Display contents of the display unit 54 which are displayed on the panel of the display unit 54 may include indications of single shot/continuous shooting, self timer, a compression rate, a number of recorded pixels, a number of recorded shots, a remaining number of shots, a shutter speed, an aperture value, exposure correction, and/or the like. Further, the display unit 54 may display indications, such as flash, red-eye reduction, macro shooting, buzzer setting, remaining amount of a clock battery, remaining amount of batteries, error information, information in a plurality of digits, a detached/attached state of a recording medium, a communication interface operation, date, time, and/or the like.

The display contents of the display unit 54 which are displayed in the optical viewfinder 104 may include indications of in-focus, camera-shake warning, flash charge, shutter speed, aperture value, exposure correction, and/or the like.

The non-volatile memory 56 is an electrically erasable and recordable memory such as an electrically erasable programmable read-only memory (EEPROM).

The image capturing apparatus 100 further includes a mode dial 60, a shutter switch (SW1) 62, a shutter switch (SW2) 64, the operation unit 66, and a microphone 68 which are input units for a user to input various operation instructions to the system control unit 50. Such input units are configured with a single device, such as a switch, a dial, a touch panel, pointing by detection of a line of sight, voice recognition, or the like, or a combination of a plurality of such devices.

The mode dial 60 specifies switching between functional modes including power ON, power OFF, selective focus/parameter shooting mode, manual shooting mode, automatic shooting mode, panoramic shooting mode, reproduction mode, multiple screen reproducing/erasing mode, personal computer (PC) connection mode, and/or the like.

The shutter switch (SW1) 62 is switched ON when a shutter button (not illustrated) is partially pressed, e.g. a half-stroke state or the like, thereby instructing the system control unit 50 to start shooting preparation which is to be performed before a shooting, including, for example, AF processing, AE processing, AWB processing, EF processing, and/or the like.

The shutter switch (SW2) 64 is switched ON when the shutter button (not illustrated) is further strongly pressed, e.g. a full stroke state or the like, thereby instructing the system control unit 50 to start a shooting operation. In response to switching ON the shutter switch (SW2) 64, an exposure processing is performed. In the exposure processing, a signal read from the image sensor 14 is written in the memory 30 through the A/D converter 16 and the memory control unit 22. Subsequently, a start of a series of processing operations is instructed, including an exposure process (a process of writing a signal as raw image data read from the image sensor 14 in the memory 30 through the A/D converter 16 and the memory control unit 22), development process (a process of converting the raw image data into an image in an arithmetic process performed by the image processing unit 20 or the memory control unit 22), and recording process (a process of reading out image data from the memory 30, causing the compression/expansion unit 32 to compress the image data, and writing the compressed image data in the recording medium 200 or 210).

The operation unit 66 includes various kinds of buttons and touch panels, such as a menu button, a set button, a macro selection button, a multi-screen reproduction and page-advance button, a flash setting button, a single-shot/serial-shot/self-timer selection button, and/or the like. Further, the operation unit 66 includes a forward (+) menu item selection button, a backward (−) menu item selection button, a forward (+) reproduction image search button, a backward (−) reproduction image search button, a shooting quality selection button, an exposure correction button, a date/time set button, and/or the like.

The image capturing apparatus 100 further includes a power supply control unit 80, connectors 82 and 84, a power supply 86, interfaces 90 and 94, connectors 92 and 96, the optical viewfinder 104, a communication unit 110, a connector (antenna) 112, and a detachable recording medium detection unit 98.

The power supply control unit 80 includes a battery detection circuit, a direct current (DC)-DC converter, and a switch circuit for switching the blocks to be energized. The power supply control unit 80 detects the attached/detached state of the battery, a battery type and the remaining battery power level, and controls the DC-DC converter based on the detection result and an instruction from the system control unit 50. The power supply control unit 80 then supplies a necessary voltage for a necessary period to each of the units including the recording medium.

The power supply 86 may be one or a plurality of any standard form of power cell including but not limited to alkaline, lithium (Li), Li hydride, Li ion, Li polymer, nickel cadmium (NiCd), nickel metal hydride (NiMH), solar cells, and/or the like. Other types of alternating current (AC) or DC power sources may be used as well. For example, the power supply can include a primary battery, such as an alkaline battery, a lithium battery and/or the like, a secondary battery, such as an NiCd battery, an NiMH battery, an Li battery, and/or the like, and an AC adapter.

The interfaces 90 and 94 transmit and receive data to and from the recording media 200 and 210, such as a memory card, a hard disk, and/or the like. The connectors 92 and 96 connect the image capturing apparatus 100 and the recording media 200 and 210. The detachable recording medium detection unit 98 detects whether the recording medium 200 or the recording medium 210 is connected to the connector 92 or the connector 96. The present exemplary embodiment describes a case where there are two systems of interfaces and connectors for attaching the recording medium. However, there can be any number of systems of interfaces and connectors for attaching the recording medium. Further, interfaces and connectors pursuant to different standards may be combined.

Cards in conformity with Personal Computer Memory Card International Association standards (PCMCIA cards) or cards in conformity with compact flash (CF) card standards may be used as the interfaces and connectors. In such a case, various communication cards such as a local area network (LAN) card, a modem card, a universal serial bus (USB) card, an Institute of Electrical and Electronics Engineers (IEEE) 1394 card, a P1284 card, a small computer system interface (SCSI) card, a personal handyphone system (PHS), and/or the like, can be connected. According to this configuration, image data and management information attached to the image data can be transmitted and received between other peripheral devices, such as a computer, a printer, and/or the like.

The optical viewfinder 104 is a window for confirming an object to be captured without using the electronic viewfinder function of the image display unit 28. A part of the functions of the display unit 54 including an indication of an in-focus state, a camera shake warning, a flash charge state, a shutter speed, an aperture value, exposure correction, and/or the like, are displayed inside the optical viewfinder 104.

The communication unit 110 includes various communication functions including but not limited to Recommended Standard (RS) 232, Universal Serial Bus (USB), Institute of Electrical and Electronics Engineers (IEEE) 1284, IEEE 1394, Small Computer System Interface (SCSI), modem, LAN, wireless communication, and/or the like.

The connector (antenna) 112 connects the image capturing apparatus 100 with other devices via the communication unit 110. The connector 112 functions as an antenna when performing wireless communication.

The communication unit 110 and/or the connector/antenna 112 may be configured with one or more amplifiers, antennas, transceivers, or the like for enabling the transmission and/or reception of data over a variety of different data communication networks, formats, and protocols, including but not limited to Global System for Mobile Communication (GSM), General Packet Radio Service (GPRS), Wideband Code Division Multiple Access (W-CDMA), CDMA, CDMA2000, High-Speed Downlink Packet Access (HSDPA), wireless personal area networks (e.g. Bluetooth), wireless LANs (e.g. WiFi), and/or the like.

The recording media 200 and 210, such as a memory card, a hard disk, and/or the like, are detachably attached to the image capturing apparatus 100. The recording media 200 and 210 include recording units 202 and 212 configured by a semiconductor memory, a magnetic disk, and/or the like, and interfaces 204 and 214 respectively. Further, the recording media 200 and 210 includes connectors 206 and 216 for connecting with the image capturing apparatus 100.

Under control of the system control unit 50, the display unit notifies a user of the operation state or a message by using characters, images, sound (speech), or a combination thereof. The display unit 54 includes a combination of output devices such as an LCD, LED, speaker, and/or the like. One or more display units 54 can be arranged at visible positions near an operation unit of the image capturing apparatus 100. Part of the display unit 54 is arranged in the optical viewfinder 104. Display contents shown on the display unit 54 can include such things as a self timer, a compression ratio, single shot/continuous shooting, number of recorded pixels, number of recorded images, shutter speed, F-number, exposure correction, electronic flash, red-eye effect relaxation, macro sensing, buzzer setting, timer battery level, error, information by a plurality of digits, attached state of recording mediums, operation of communication interface (I/F), date/time, or the like.

The image capturing apparatus 100 may be configured in the form of, for example, a digital camera, a video camera, or any type of device including camera, such as a pager, a cellular telephone, a radio telephone, a personal digital assistant (PDA), a Moving Pictures Expert Group Layer 3 (MP3) player, and/or the like.

The shutter switch (SW1) 62 is turned ON by partially depressing, e.g. a half-stroke state, of a shutter button (not shown). The ON shutter switch (SW1) 62 instructs the start of an operation, such as AF process, AE process, AWB process, EF process, or the like. The shutter switch (SW2) 64 is turned on by fully depressing, e.g. a full-stroke state, of a shutter button (not shown). The ON shutter switch (SW2) 64 instructs the start of a series of processing operations including an exposure process (a process of writing a signal as raw image data read from the image sensor 14 in the memory 30 through the A/D converter 16 and the memory control unit 22), development process (a process of converting the raw image data into an image in arithmetic process performed by the image processing unit 20 or the memory control unit 22), and recording process (a process of reading out image data from the memory 30, causing the compression/expansion unit 32 to compress the image data, and writing the compressed image data in the recording medium 200 or 210.

Figure 2A:
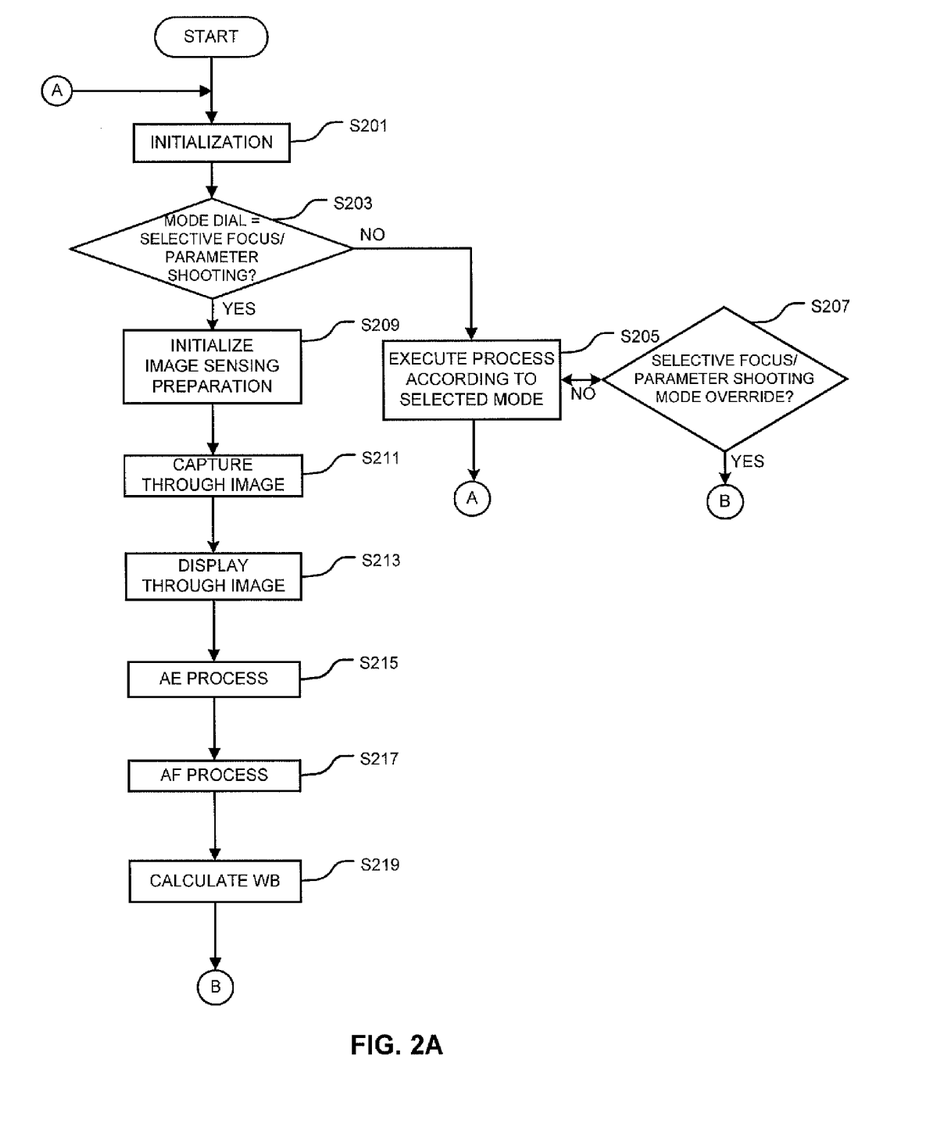
FIGS. 2A, 2B, and 2C are a flowchart illustrating selective focus/parameter processing control according to an exemplary embodiment of the present invention.
Figure 2B:
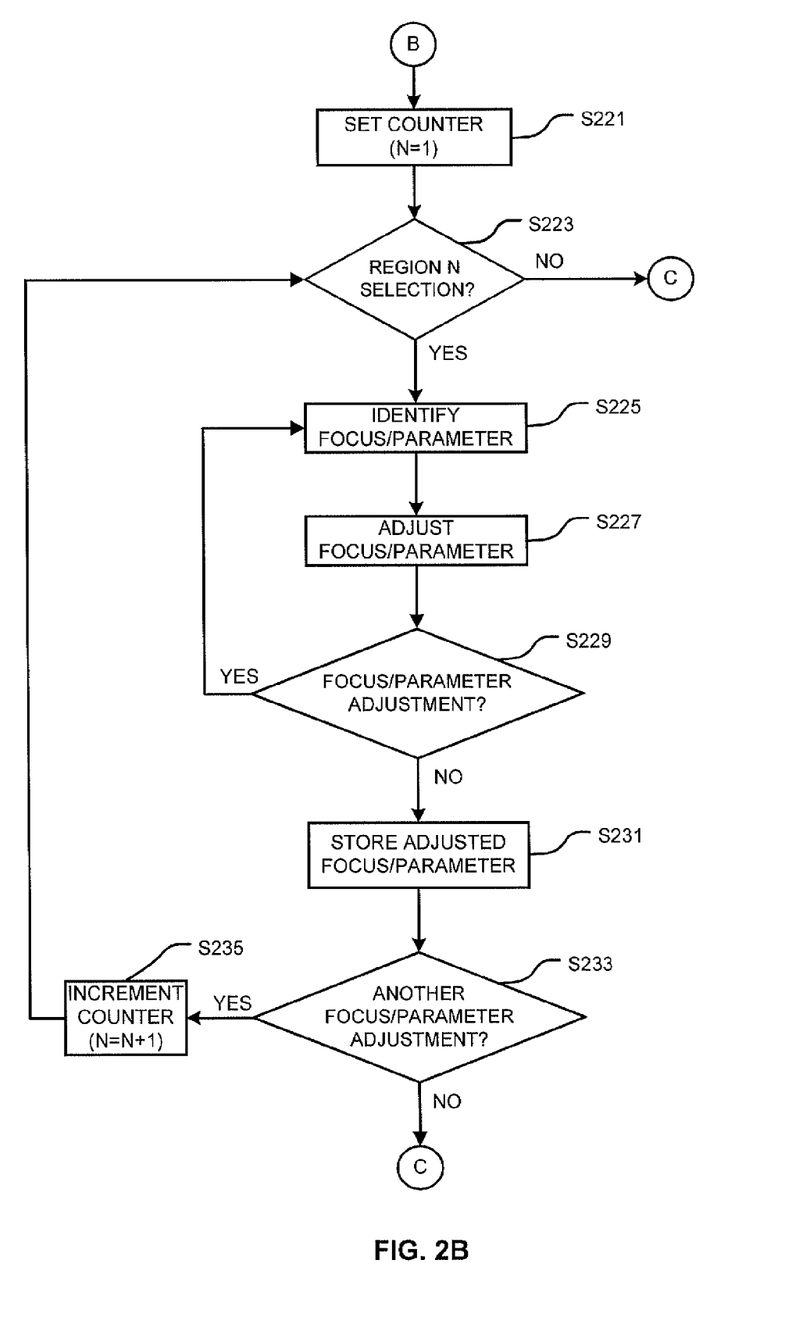
Figure 2C:
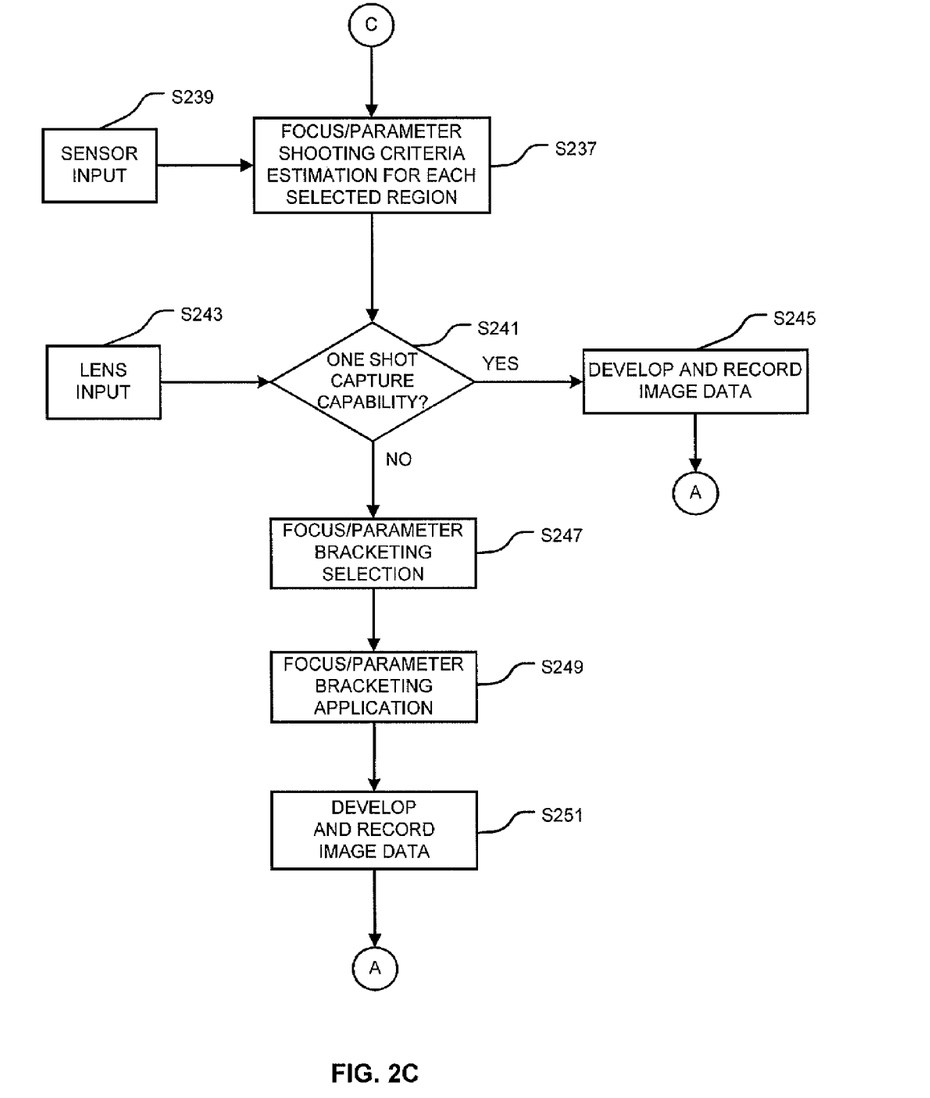

FIGS. 2A-2C are a flowchart illustrating the main operations of the selective focus/parameter shooting mode of the image capturing apparatus 100 according to an exemplary embodiment. The following processing is implemented when the system control unit 50 executes a control program stored in the memory 52.

The process begins when the image capturing apparatus 100 is provided with a power source, for example, by loading a new battery. Initialization occurs in step S201, where the system control unit 50 of the image capturing apparatus 100 initializes various kinds of flags and control variables.

If the image capturing apparatus 100 is powered OFF, the protection unit 102 is closed to protect the imaging unit. Necessary parameters, set values, and set modes, including flags and control variables, are stored in the nonvolatile memory 56. The power supply control unit 80 cuts off unnecessary power of the units of the image capturing apparatus 100.

If the image capturing apparatus 100 is powered ON, the system control unit 50 determines the operation mode set in accordance with the position of the mode dial in step S203. If the mode dial 60 is set to the selective focus/parameter shooting mode, the flow advances from step S203 to step S209 to execute the selective focus/parameter shooting mode. On the other hand, if the mode dial 60 is set to any other mode, the flow advances from step S203 to step S205. In step S205, the system control unit 50 executes processing corresponding to the selected mode.

While executing processing corresponding to the selective mode in step S205, the system control unit 50 continually monitors processing. In step S207, if the system control unit 50 determines that a selective focus/parameter shooting mode override does occur during processing in step S205, flow advances to step S221 in FIG. 2B. In step S207, if the selective focus/parameter shooting mode override does not occur, the system control unit 50 continues executing a process according to the previously selected mode in step S205, and then flow returns to step S201 in FIG. 2A.

If the mode dial 60 is set to the selective focus/parameter shooting mode, in step S209, initialization of sensing preparation is performed to display a through image sensed by the image sensor 14 on the image display unit 28. In this case, signals are added and read out (addition/reading) for each set of lines from the image sensor 14 in step S209. Upon completion of sensing preparation, in step S211, the through image is started to be displayed on the image display unit 28. That is, a through image sensed by the image sensor 14 is displayed in step S211 to implement the electronic viewfinder function. In the through display state, in step S213, data which are sequentially written in the image display memory 24 through the image sensor 14, A/D converter 16, image processing unit 20, and memory control unit 22 are sequentially displayed on the image display unit 28 via the memory control unit 22 and the D/A converter 26.

In order to continue through image display, an AE process is performed in step S215. In the AE process, the image processing unit 20 executes predetermined photometry for a signal obtained from the image sensor 14, and the obtained arithmetic result is stored in the memory 30. The system control unit 50 executes the AE process for the through image using the exposure control unit 40 based on this arithmetic result. After that, the flow advances to step S217.

In step S217, an AF process is performed where the image processing unit 20 executes a predetermined distance measurement for a signal obtained from the image sensor 14, and the obtained arithmetic result is stored in the memory 30. The system control unit 50 executes the AF process using the zoom control unit 44 based on this arithmetic result, and focuses the lens 10. Flow then advances to step S219.

In step S219, the image processing unit 20 reads out the image data stored in the memory 30 and obtains a control value for color correction, i.e., a white balance (WB) control value based on this image data. The obtained WB control value is stored in the memory 30. Predetermined development and compression processes, such as Joint Photographic Experts Group (JPEG) or the like, are then performed for the readout image data, and the processed image data is stored in the memory 30. Flow then advances to step S221.

In step S221, a counter N is set to 1. In step S223, a determination is made whether the user has selected a region N of the displayed through image. User selection of a region N occurs through user interaction of a touch-screen of the image display unit 28 with a stylus, finger pressure, finger proximity, or the like. User selection of a region N may also be achieved through voice recognition or through the use of existing image capturing apparatus hardware, e.g. a button, key, etc. For example, the user can issue voice commands to cause the system control unit 50 to adjust the focus via voice recognition.

When a user selects a region N on the image display unit 28, manually or via voice recognition, flow advances to step S225 and the user can adjust focus/parameters of the selected region N through the system control unit 50. Although not shown, the image capturing apparatus 100 of FIG. 1 may be configured for and can include components for enabling voice recognition. The image display unit 28 may also be configured to admit touch-screen inputs, keypad and/or functional/hot buttons into a user interface display to facilitate display, manipulation, and/or transmission of digital media files and/or other imaging functionality. If the user does not select a region N on the image display unit 28, flow advances to step S237 in FIG. 2C.

In step S225, when the image display unit 28 is configured as a touch-screen, the user selects a region N of the image displayed on the display unit 28 where the user wants to make focus/parameter changes of various image properties. When the user selects a particular region N, the image display unit 28 displays the selected region N and an interaction mechanism to enable the user to select a particular focus/parameter for further adjustment. In step S225, the user identifies a particular focus/parameter for further adjustment, and the image display unit 28 displays the selected region N with an interactive adjustment mechanism for adjusting the particular focus/parameter identified by the user. Flow then advances to step S227.

In step S227, the user can move a stylus, use finger pressure, finger proximity, or the like, to adjust the particular focus/parameter. Alternatively, the user can adjust the particular focus/parameter using voice recognition or through the use of existing image capturing apparatus hardware, e.g. a button, key, etc. If the user desires to adjust the focus, the user can adjust the focus by moving a stylus, using finger pressure, applying finger proximity, or the like, on an interactive adjustment mechanism at a particular location on the display unit 28, to adjust the focus.

For example, the image display unit 28 may be configured to display a horizontal slider bar and/or a vertical slider bar at a particular location on the display unit 28. The user may move the slider bar in one direction to make the selected region in clearer focus, and may move the slider bar in another direction to make the selected region N less clearly in focus. The image display unit 28 may be configured with other interactive adjustment mechanisms to enable the user to make a focus/parameter change. The user can similarly adjust other image properties, such as sharpness, color saturation and/or the like. Flow then advances to step S229.

In step S229, the system control unit 50 determines whether the user wants to make another focus/parameter adjustment. If the user wants to make another focus/parameter adjustment, flow returns to step S225. If the user does not want to make another focus/parameter adjustment, flow advances to step S231.

In step S231, the adjusted focus/parameters of the selected region N are stored in the memory 30. Flow advances to step S233 where the system control unit 50 determines whether the user selects another region of the displayed through image on the image display unit 28. If the user selects another region of the image displayed on the image display unit 28, flow advances to step S235 where the counter is incremented (N=N+1) and flow then returns to step S223. If the user does not select another region of the displayed through image on the image display unit 28, flow advances to step S237 in FIG. 2C.

In step S237, the system control unit 50 combines sensor input from the image sensor 14, AF infrared sensors, and/or the like, in step S239, and estimates focus/parameter criteria for each selected region where adjusted focus/parameters are saved in the memory 30. Flow advances to step S241.

In step S241, the system control unit 50 determines one shot capture capability based on a combination of the estimated focus/parameter criteria from step S237 and lens input data from the photographic lens 10 from step S243. If the system control unit 50 determines capability of one shot capture based on a combination of the estimated focus/parameter criteria from step S237 and lens input data from step S243, flow advances to step S245 and image data is developed and recorded in the recording media 200 and 210. Flow then returns to step S201 in FIG. 2A.

If the system control unit 50 determines that one shot capture is not capable based on a combination of the estimated focus/parameter criteria from step S237 and lens input data from step S243 as shown in step S241, flow advances to step S247 where the system control unit 50 determines a selection of a focus/parameter bracketing with appropriate focusing values. Bracketing refers to collecting multiple images of the same scene or object while adjusting the image apparatus' settings between shots. Focus/parameter bracketing is performed by collecting multiple images while adjusting the focus distance between different shots with the intent of focusing at different distances from the image apparatus. Flow then advances to step S249.

In step S249, the system control unit 50 blends each selected region saved in the memory 30 using a focus/parameter bracketing application, by aligning each selected region so that common features are present at substantially similar pixel locations in each selected region. A characteristic of a digital image pixel is then selected for controlling the proportions used when blending pixels. Blending can include but is not limited to color saturation, hue and contrast, where contrast is a measure of the absolute difference in intensity between a pixel and its immediate neighbors. Images captured by focus bracketing may have different magnification and may be subject to a rescaling process before registration. Scalar representations of the characteristics are evaluated and can be smoothed by a process of averaging the scalar values for a pixel with the scalar values of all pixels within a specified neighboring region. Flow then advances to step S251 where the image data is developed and recorded in the recording media 200 and 210. Flow then returns to step 201 in FIG. 2A.

As described above, the system control unit 50 can be configured to determine whether a selective focus/parameter shooting mode override occurs in step S207. Such an override can occur during operation of any mode other than the selective focus/parameter shooting mode. For example, presume a user is utilizing the image capturing apparatus 100 when the mode dial 60 is configured for the panoramic shooting mode. In step S205, if the user decides to select a region N of an image being displayed on the image display unit 28, the user can select the region N of the image and override of the panoramic shooting mode occurs in step S207. If a selective focus/override does occur, flow advances to step S223, in FIG. 2B, where the user can adjust focus/parameters of the image, including saturation, sharpness, and/or the like. If a selective focus/parameter shooting mode override does not occur, the system control unit 50 continues executing a process according to the previously selected mode in step S205, and then flow returns to step S201 in FIG. 2A.

Figure 3A:
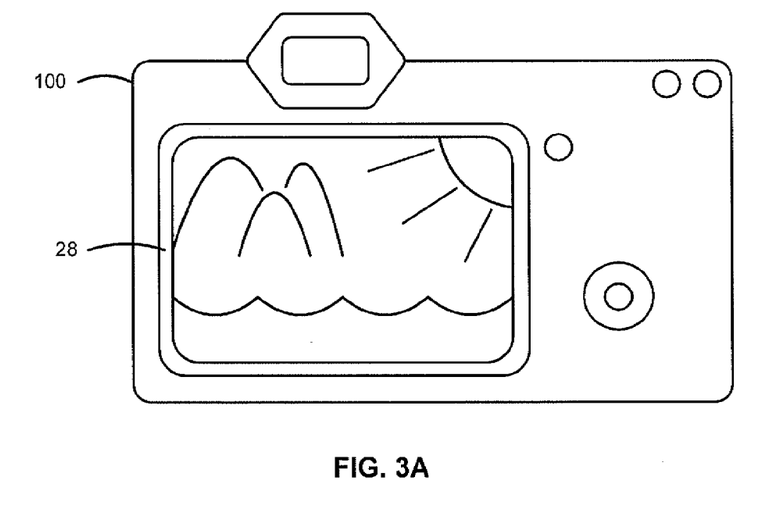
FIGS. 3A, 3B, 3C, and 3D illustrate an image being displayed on a display unit of the image capturing apparatus of FIG. 1.
Figure 3B:
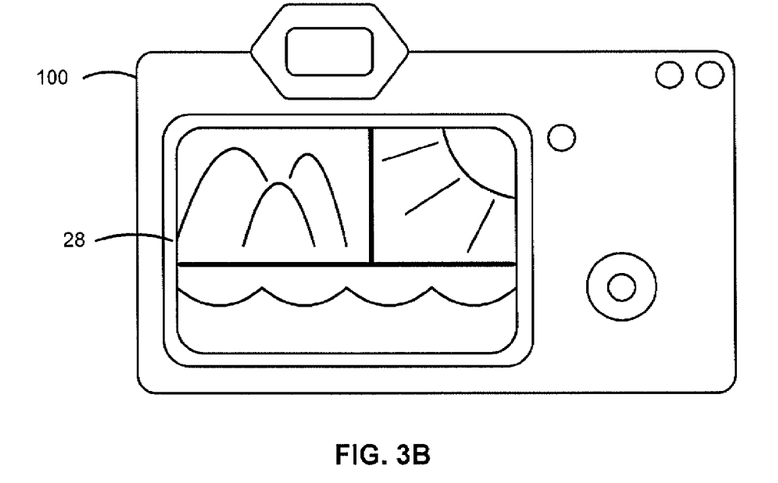
Figure 3C:
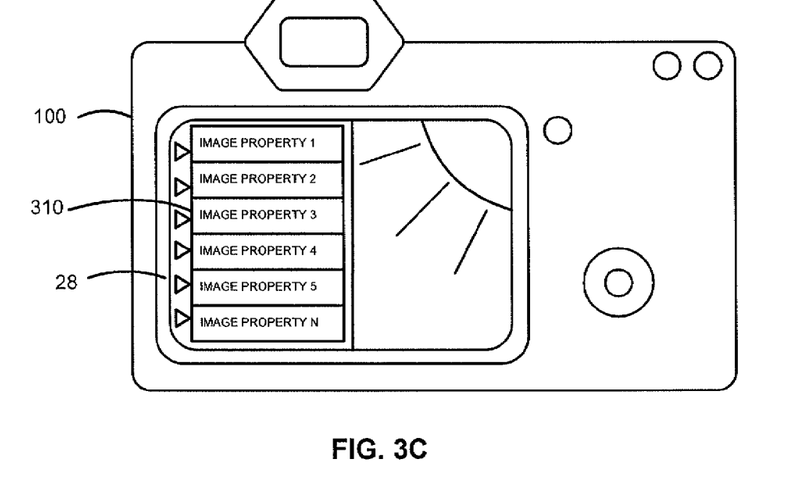

FIGS. 3A-3D illustrate an image being displayed where an image region N can be adjusted on the display unit 28 of the image capturing apparatus 100 of FIG. 1. Initially, a user points the image capturing apparatus 100 at a particular scene, and an image of the scene is displayed through the image display unit 28, as shown in FIG. 3A. The user can then move a stylus, use finger pressure, finger proximity or the like, and select one or more regions of the image on the image display unit 28, as shown in FIG. 3B. As shown in FIG. 3C, once the user selects a region N of the image displayed on the display unit 28 where the user wants to make focus/parameter changes, the selected region N is displayed with an interaction mechanism to enable the user to select a particular focus/parameter, such as image property 1, image property 2, . . . image property N. The interaction mechanism shown in FIG. 3C enables a user to select a particular image property.

Figure 3D:
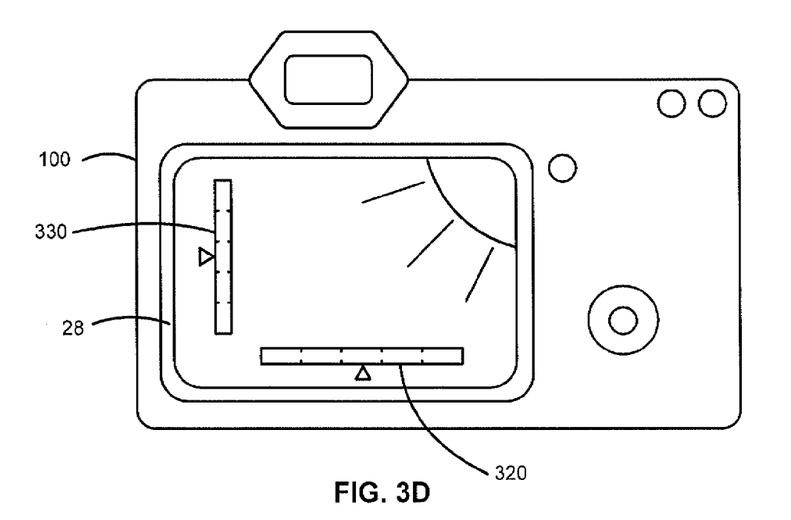

As shown in FIG. 3D, when the user selects a particular image property, the selected region N is displayed on the image display unit 28, as well as an interactive adjustment mechanism to enable the user to adjust the selected image property from FIG. 3C. For example, the image display unit 28 may be configured to display a horizontal slider bar 320 and/or a vertical slider bar 330 at a particular location on the display unit 28. The user may move an interactive adjustment mechanism associated with the slider bar(s) in one direction to adjust the selected image properly. For example, the user may move an adjustment mechanism in the form of a pointer to make the selected region in clearer focus, and may move the slider bar in another direction to make the selected region N less clearly in focus. The image display unit 28 may be configured with other interactive adjustment mechanisms to enable the user to make an image property change. The user can similarly adjust other image properties.

The image capturing apparatus 100 is configured to override the AF mode and allow multiple regions to be selectively focused. There may be a non-professional mode and a professional mode.

The present invention provides a selective focus/parameter process where adjustment of image properties based on user visual selection of one or a plurality of regions of an image. The selective region-based focus/parameter shooting mode according to the present invention is not available in current image capturing apparatuses.

The present invention provides an image capturing apparatus with a superior user interface offering photographers an intuitive and selective focus adjustment in the image capturing apparatus to express their creative intent. Photographers can adjust a desired region of an image intuitively and the image capturing apparatus can use appropriate focal adjustment.

The processing described in the above embodiments may be realized by providing a storage medium, storing program codes of software realizing the above-described functions, to a computer system or apparatus. By reading the program codes stored in the storage medium with a computer, CPU (Central Processing Unit), MPU (Micro-Processing Unit), and/or the like, of the system and apparatus and executing them, the functions of the above-described embodiments can be realized. In this case, the program codes read from the storage medium realize the functions according to the embodiments, and the storage medium storing the program codes constitutes the invention. The storage medium, such as a floppy disk, a hard disk, an optical disk, a magneto-optical disk, and/or the like, can be used providing the program codes.

Furthermore, the functions according to the above embodiments are realized not only by executing the program codes read by the computer. The present invention also includes a case where an OS (operating system) or the like working on the computer performs part or the entire processes in accordance with designations of the program codes and realizes the functions according to the above embodiments.

Furthermore, the program codes read from the storage medium may be written in a function expansion card which is inserted into the computer or in a memory provided in a function expansion unit which is connected to the computer. Thereafter, a CPU or the like contained in the function expansion card or unit may perform part or the entire processes in accordance with designations of the program codes and may realize the functions of the above embodiments.

As many apparently widely different embodiments of the present invention can be made without departing from the spirit and scope thereof, it is to be understood that the invention is not limited to the specific embodiments thereof except as defined in the claims.

What is claimed is:

1. An image capturing apparatus for selective real-time focus/parameter adjustment, the apparatus comprising:
   a display unit configured to display an image;
   an interface unit configured to enable a user to select a plurality of regions of the image displayed on the display unit;
   an adjustment unit configured to enable the user to adjust at least one focus/parameter to control focusing and degree of sharpness of at least one selected region of the image displayed on the display unit;
   a determining unit configured to determine whether capture of the displayed image is achievable in one shot based on a combination of lens input data and at least one focus/parameter adjusted by the user to control focusing and degree of sharpness about at least one region selected by the user;
   an image capturing unit configured to capture multiple images in accordance with the at least one focus/parameter adjusted by the user to control focusing and degree of sharpness about the at least one region selected by the user if the determining unit determines capture of the displayed image is not achievable in one shot based on a combination of the lens input data and the at least one focus/parameter adjusted by the user regarding focus and sharpness about the at least one region selected by the user, to capture the displayed image in one shot in accordance with the combination of lens input data and the at least one focus/parameter adjusted by the user if the determining unit determines capture of the displayed image is achievable in one shot based on the combination of the lens input data and the at least one focus/parameter adjusted by the user, and to capture the displayed image in one shot in accordance with the combination of lens input data and a plurality of adjusted focus/parameters in a plurality of regions if the plurality of focus/parameters are adjusted by the user and the determining unit determines capture of the displayed image is achievable in one shot based on the combination of the lens input data and the plurality of adjusted focus/parameters; and
   a generation unit configured to convert the image including the at least one adjusted selected region into image data, where at least one focus/parameter of the at least one adjusted selected region has been adjusted by the adjustment unit prior to conversion.

2. The image capturing apparatus according to claim 1, wherein the image capturing apparatus is configured with a selective focus/parameter shooting mode.

3. The image capturing apparatus according to claim 1, wherein the adjustment unit is configured with an interactive adjustment mechanism to enable the user to adjust a plurality of focus/parameters of the at least one selected region displayed on the display unit.

4. The image capturing apparatus according to claim 3, wherein the interactive adjustment mechanism comprises at least one of a horizontal slider bar and a vertical slider bar.

5. The image capturing apparatus according to claim 3, wherein the plurality of focus/parameters comprise at least one of focus, sharpness, and color saturation.

6. The image capturing apparatus according to claim 1, wherein the adjustment unit is configured with a focus/parameter bracketing function.

7. The image capturing apparatus according to claim 1, wherein the adjustment unit is configured to perform focus/parameter bracketing by collecting multiple images while adjusting a focus distance between different shots, blending each selected region using a focus/parameter bracketing application by aligning each selected region so that common features are present at substantially similar pixel locations in each selected region, selecting a characteristic of a digital image pixel for controlling proportions used when blending pixels, and developing and recording the image data, if one shot capability is not determined.

8. The image capturing apparatus according to claim 1, wherein the interface unit is configured with a touch screen.

9. The image capturing apparatus according to claim 1, wherein the interface unit is configured for voice recognition.

10. A method for an image capturing apparatus including a display unit, an interface unit, an adjustment unit, a determining unit, and a generating unit, for selective real-time focus/parameter adjustment, the method comprising:
   displaying an image on the display unit;
   selecting a plurality of regions of the image displayed on the display unit;

adjusting at least one focus/parameter to control focusing and degree of sharpness of at least one selected region of the image displayed on the display unit;

determining whether capture of the displayed image is achievable in one shot based on a combination of lens input data and at least one focus/parameter adjusted by a user to control focusing and degree of sharpness about at least one region selected by the user;

capturing multiple images in accordance with the at least one focus/parameter adjusted by the user to control focusing and degree of sharpness about the at least one region selected by the user if the determining unit determines capture of the displayed image is not achievable in one shot based on a combination of the lens input data and the at least one focus/parameter adjusted by the user regarding focus and sharpness about the at least one region selected by the user;

capturing the displayed image in one shot in accordance with the combination of lens input data and the at least one focus/parameter adjusted by the user if the determining unit determines capture of the displayed image is achievable in one shot based on the combination of the lens input data and the at least one focus/parameter adjusted by the user;

capturing the displayed image in one shot in accordance with the combination of lens input data and a plurality of adjusted focus/parameters in a plurality of regions if a plurality of focus/parameters are adjusted by the user and the determining unit determines capture of the displayed image is achievable in one shot based on the combination of the lens input data and the plurality of adjusted focus/parameters; and converting the image including the at least one adjusted selected region into image data, where at least one focus/parameter of the at least one adjusted selected region has been adjusted by the adjustment unit prior to conversion.

11. The method according to claim 10, further comprising configuring the image capturing apparatus with a selective focus/parameter shooting mode.

12. The method according to claim 10, wherein the adjusting step further comprises adjusting a plurality of focus/parameters of the at least one selected region displayed on the display unit.

13. The method according to claim 12, wherein the adjusting step further comprises providing an interactive adjustment mechanism comprising at least one of a horizontal slider bar and a vertical slider bar.

14. The method according to claim 10, wherein the plurality of focus/parameters comprise at least one of focus, sharpness, and color saturation.

15. The method according to claim 10, wherein the adjusting step further comprises performing a focus/parameter bracketing function.

16. The method according to claim 15, wherein the focus/parameter bracketing function is performed by collecting multiple images while adjusting a focus distance between different shots, blending each selected region using a focus/parameter bracketing application by aligning each selected region so that common features are present at substantially similar pixel locations in each selected region, selecting a characteristic of a digital image pixel for controlling proportions used when blending pixels, and developing and recording the image data, if one shot capability is not determined.

17. The method according to claim 10, further comprising configuring the display unit with a touch screen.

18. The method according to claim 10, further comprising configuring the image capturing apparatus for voice recognition.

19. An image capturing apparatus for selective parameter adjustment, the apparatus comprising:
a display control unit configured to control a display of an image;
an interface unit configured to enable a user to select a plurality of regions of the image;
an adjustment unit configured to enable the user to adjust a plurality of parameters to control at least one of focusing and degree of sharpness of the plurality of selected regions of the image;
a determining unit configured to determine whether capture of the image is achievable in one shot, based on the plurality of parameters adjusted by the user to control at least one of focusing and degree of sharpness about the plurality of regions selected by the user; and
an image capturing unit configured to (1) capture multiple images in accordance with the plurality of parameters adjusted by the user to control at least one of focusing and degree of sharpness about the plurality of regions selected by the user if the determining unit determines capture of the image is not achievable in one shot based on the plurality of parameters adjusted by the user, and (2) to capture the image in one shot in accordance with the plurality of parameters adjusted by the user to control at least one of focusing and degree of sharpness about the plurality of regions selected by the user if the determining unit determines capture of the image is achievable in one shot.

20. The image capturing apparatus according to claim 19, wherein the image capturing apparatus is configured with a selective parameter shooting mode.

21. The image capturing apparatus according to claim 19, wherein the adjustment unit is configured with an interactive adjustment mechanism to enable the user to adjust a plurality of parameters of the plurality of the selected regions.

22. The image capturing apparatus according to claim 21, wherein the interactive adjustment mechanism comprises at least one of a horizontal slider bar and a vertical slider bar.

23. The image capturing apparatus according to claim 21, wherein the plurality of parameters comprise at least one of focus, sharpness, and color saturation.

24. The image capturing apparatus according to claim 19, wherein the adjustment unit is configured with a parameter bracketing function.

25. The image capturing apparatus according to claim 19, wherein the adjustment unit is configured to perform parameter bracketing by collecting multiple images while adjusting a focus distance between different shots, blending each selected region using a parameter bracketing application by aligning each selected region so that common features are present at substantially similar pixel locations in each selected region, selecting a characteristic of a digital image pixel for controlling proportions used when blending pixels, and developing and recording the image data, if one shot capability is not determined.

26. The image capturing apparatus according to claim 19, wherein the interface unit is configured with a touch screen.

27. The image capturing apparatus according to claim 19, wherein the interface unit is configured for voice recognition.

28. A method for an image capturing apparatus including a display unit, an interface unit, an adjustment unit, and a determining unit, for selective parameter adjustment, the method comprising:
controlling display of an image on the display unit;

selecting a plurality of regions of the image;
adjusting a plurality of parameters to control at least one of focusing and degree of sharpness of the plurality of selected regions of the image;
determining whether capture of the image is achievable in one shot, based on the plurality of parameters adjusted by a user to control the at least one of focusing and degree of sharpness about the plurality of regions selected by the user;
capturing multiple images in accordance with the plurality of parameters adjusted by the user to control at least one of focusing and degree of sharpness about the plurality of regions selected by the user if the determining unit determines capture of the image is not achievable in one shot based on the plurality of parameters adjusted by the user; and
capturing the image in one shot in accordance with the plurality of parameters adjusted by the user to control at least one of focusing and degree of sharpness about the plurality of regions selected by the user if the determining unit determines capture of the image is achievable in one shot.

29. The method according to claim 28, further comprising configuring the image capturing apparatus with a selective parameter shooting mode.

30. The method according to claim 28, wherein the adjusting step further comprises adjusting a plurality of parameters of the plurality of the selected regions.

31. The method according to claim 30, wherein the adjusting step further comprises providing an interactive adjustment mechanism comprising at least one of a horizontal slider bar and a vertical slider bar.

32. The method according to claim 28, wherein the plurality of parameters comprise at least one of focus, sharpness, and color saturation.

33. The method according to claim 28, wherein the adjusting step further comprises performing a parameter bracketing function.

34. The method according to claim 33, wherein the parameter bracketing function is performed by collecting multiple images while adjusting a focus distance between different shots, blending each selected region using a parameter bracketing application by aligning each selected region so that common features are present at substantially similar pixel locations in each selected region, selecting a characteristic of a digital image pixel for controlling proportions used when blending pixels, and developing and recording the image data, if one shot capability is not determined.

35. The method according to claim 28, further comprising configuring the display unit with a touch screen.

36. The method according to claim 28, further comprising configuring the image capturing apparatus for voice recognition.

* * * * *